United States Patent
Brown

(10) Patent No.: US 12,004,509 B2
(45) Date of Patent: Jun. 11, 2024

(54) CO-FORMULATION COMPRISING A PLANT GROWTH REGULATOR AND AN OIL, AND METHODS OF PREPARING AND USING SAID CO-FORMULATION

(71) Applicant: Indorama Ventures Oxides Australia Pty Limited, Brooklyn (AU)

(72) Inventor: Rowan Brown, Ascot Vale (AU)

(73) Assignee: INDORAMA VENTURES OXIDES AUSTRALIA PTY LIMITED, Brooklyn (AU)

( * ) Notice: Subject to any disclaimer, the term of this patent is extended or adjusted under 35 U.S.C. 154(b) by 324 days.

(21) Appl. No.: 16/083,580

(22) PCT Filed: Oct. 12, 2017

(86) PCT No.: PCT/US2017/000216
§ 371 (c)(1),
(2) Date: Sep. 10, 2018

(87) PCT Pub. No.: WO2018/090072
PCT Pub. Date: May 24, 2018

(65) Prior Publication Data
US 2020/0305419 A1    Oct. 1, 2020

(30) Foreign Application Priority Data
Nov. 18, 2016 (AU) .................. 2016904732

(51) Int. Cl.
| A01N 25/04 | (2006.01) |
| A01N 43/82 | (2006.01) |
| A01N 47/30 | (2006.01) |
| A01N 61/02 | (2006.01) |

(52) U.S. Cl.
CPC ............. *A01N 25/04* (2013.01); *A01N 43/82* (2013.01); *A01N 47/30* (2013.01); *A01N 61/02* (2013.01)

(58) Field of Classification Search
CPC ........ A01N 25/04; A01N 47/30; A01N 43/82; A01N 61/02
See application file for complete search history.

(56) References Cited

U.S. PATENT DOCUMENTS

| 4,261,726 A | 4/1981 | Rusch et al. |
| 4,613,354 A * | 9/1986 | Rusch .................... A01N 47/36 504/139 |
| 5,631,205 A | 5/1997 | Killick et al. |
| 6,274,535 B1 | 8/2001 | Feurer et al. |
| 2007/0066489 A1 | 3/2007 | Vermeer et al. |
| 2008/0032891 A1 | 2/2008 | Gaytan et al. |
| 2008/0176746 A1* | 7/2008 | Grohs .................... A01N 43/56 504/211 |
| 2010/0130364 A1 | 5/2010 | Casana Giner et al. |
| 2011/0275516 A1* | 11/2011 | Wu .................... A01N 25/10 504/105 |
| 2014/0066309 A1* | 3/2014 | Schnabel ............... A01N 47/44 504/324 |
| 2014/0206542 A1* | 7/2014 | Moody .................. A01N 43/70 504/234 |
| 2015/0099635 A1* | 4/2015 | Holliday ................ A01N 47/30 504/330 |

FOREIGN PATENT DOCUMENTS

| AU | 5429101 A1 | 1/2002 |
| CA | 2451130 A | 1/2003 |
| CN | 102057900 B | 5/2013 |
| CN | 105851033 A | 8/2016 |
| CN | 106070279 A | 11/2016 |
| JP | 2014-516056 A | 7/2014 |
| WO | 2005107465 A | 11/2005 |
| WO | 2005107466 A | 11/2005 |
| WO | 2005107471 A | 11/2005 |
| WO | 2005107472 A | 11/2005 |
| WO | 2012/167322 A1 | 12/2012 |
| WO | 2015024995 A | 2/2015 |

\* cited by examiner

*Primary Examiner* — Johann R Richter
*Assistant Examiner* — Danielle Johnson
(74) *Attorney, Agent, or Firm* — Patterson + Sheridan, LLP

(57) ABSTRACT

An agricultural co-formulation comprising: an effective amount of at least one plant growth regulator, or at least one plant growth regulator and an additional biologically active ingredient, in a comminuted form having an average particle size in the range of from 1 to 12 microns; at least one oil; at least one oil-soluble surfactant dispersing agent; and at least one emulsifying agent, wherein the final concentration of the at least one plant growth regulator, or at least one plant growth regulator and an additional biologically active ingredient, is optionally adjusted by adding additional oil and one or more rheology modifiers and/or activation agents as required to substantially stabilise the co-formulation; and wherein the efficacy of the plant growth regulator is substantially maintained or improved; and one or more methods of making the co-formulation.

25 Claims, 1 Drawing Sheet

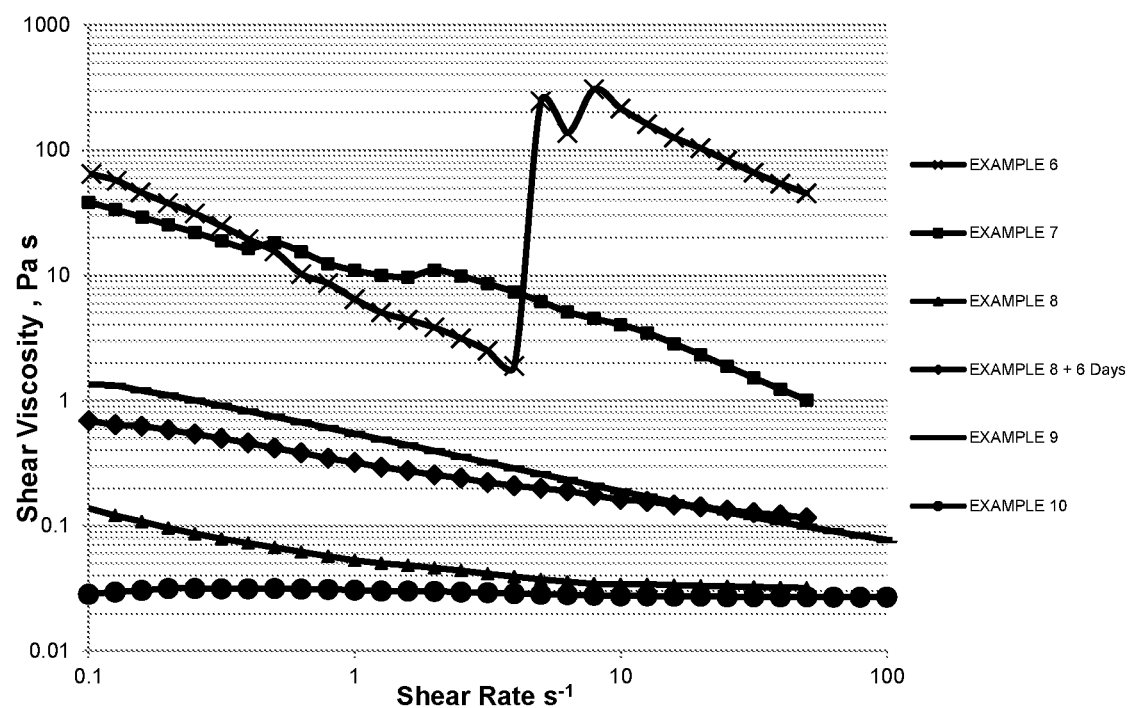

CO-FORMULATION COMPRISING A PLANT GROWTH REGULATOR AND AN OIL, AND METHODS OF PREPARING AND USING SAID CO-FORMULATION

CROSS-REFERENCE TO RELATED APPLICATIONS

This application is the National Phase of International Application PCT/AU2017/000216 filed Oct. 12, 2017 which designated the U.S. and which claims priority to Australian App. Serial No. 2016904732 filed Nov. 18, 2016. The noted applications are incorporated herein by reference.

FIELD OF THE INVENTION

The invention generally relates to the co-formulation of at least one plant growth regulator, or at least one plant growth regulator and an additional biologically active ingredient, or mixtures thereof, with various oils to form agricultural oil-based dispersions or oil dispersions. More particularly, the present invention relates to an oil-dispersion containing a plant growth regulator, or a mixture of a plant growth regulator and an herbicide, which may subsequently be used as a defoliant. It will be convenient to hereinafter describe the invention in relation to the use of the oil dispersion as a defoliant, particularly upon cotton crops. It should be appreciated, however, that the present invention is not limited to that application only.

BACKGROUND TO THE INVENTION

The defoliation of cotton crops is a well-established practice that has been undertaken commercially for many years. Once defoliation has been induced, the harvesting of the cotton crop by mechanical means is greatly facilitated. In the past, most of the chemicals used in this practice achieved defoliation by subjecting the plant to "biological shock", which resulted in chlorosis and freezing of the leaves and resultant burning of the plant. However, this treatment adversely affected both the yield and quality of the cotton crop.

It is a far more preferable practice for pure defoliation to occur, where only the leaves of the plant are affected and the remainder of the plant remains unharmed. One example of where this was first outlined was in 1967 in U.S. Pat. No. 3,321,293, which described the use of purine derivatives of the kinetin type, the most preferred being 6-anilinopurine. This compound was shown to be particularly efficacious in small quantities without exhibiting any herbicidal side-effects.

The utility of plant growth regulators, specifically those which retarded specific vegetative growth characteristics, was later discovered as being useful in the field of defoliation. For example, the application of thidiazole-urea derivatives for use as a plant growth regulator, or as a defoliant used in combination with one other plant growth regulator, was first described in 1981 by Schering AG in U.S. Pat. No. 4,261,726. Building upon this, in 1986, Schering AG described the use of thidiazuron in combination with diuron as further improved defoliant compositions in U.S. Pat. No. 4,613,354.

Additional improvements in the efficiency of defoliation of the base mixtures of thidiazuron, or thidiazuron in combination with diuron, where the improved performance is only achieved when these active ingredients are combined with additional pesticidal components, was described in, for example, U.S. Pat. No. 6,274,535.

Not surprisingly, even further efficiencies or improvements are continually sought so that modern-day agrochemicals meet the demand for improved ecological profiles, biological efficacy, and/or economics. As such, there is a corresponding need to develop formulations and/or delivery systems that better satisfy at least one of these requirements and continue to provide benefits or advantages over existing technology.

One common formulation design strategy for achieving such requirements is the combination or co-formulation of agrochemicals and/or specific formulation auxiliaries, which might otherwise be applied individually. The primary logic is that one of the more effective methods for fulfilment of the aforementioned requirements, for example, the co-formulation of agrochemicals and/or specific formulation auxiliaries, which previously might have been applied as separate, individual delivery systems, could potentially be applied as one formulation. This would result in reduced waste, reduced labour inputs, reduced application complexity, as well as possible synergistic benefits with respect to efficacy.

One particular formulation type that is well suited to this delivery strategy is the dispersion of an agriculturally active solid in oil, forming either an oil dispersion (hereinafter "OD") concentrate, or an oil-miscible flowable (hereinafter "OF") concentrate, as defined by CropLife International, an international trade association of agribusiness companies that was founded in 2001. The key advantage in this instance is that an oil or solvent, which may typically be applied in a customary fashion as an individual or stand-alone spraying oil as an adjuvant, is included in the composition itself.

This type of formulation is particularly relevant to the field of defoliation. For example, in U.S. Pat. No. 4,613,354 the possibility of formulating thidiazuron, or mixtures of thidiazuron and diuron, is discussed, but this document also discloses that the nature and rate of action of a given composition may be increased through the addition of additives including organic solvents, wetting agents or oils. In many countries, this stated effect is already being exploited, not through modification of the specific defoliating composition via addition of these components, but through application of these components to the pre-application pre-broadcast mixture in the form of commercially available spray oils, for example. This is known to enhance the efficiency of defoliation.

While it would therefore seem to be reasonably intuitive to attempt co-formulation of an oil and defoliating agent to form an oil-based dispersion or OD, it is however known to those skilled in the art that non-aqueous dispersions of agrochemically active ingredients are notoriously difficult to stabilise. Given the major difficulty associated with the development of robust OD and OF formulations of systems with commercially feasible stability horizons, these often require complex preparative methodologies and specialty functional additives. It is therefore not completely obvious, and nor is it an intuitive process, to develop such a formulation, which contrasts with the relative ease of successfully formulating the most common delivery systems that are typically chosen for the application of existing defoliants. Such common delivery systems may include, but are not limited to, wettable powders, soluble powders, water dispersible granules, water soluble granules, dusts, suspension concentrates, emulsifiable concentrates, and emulsions.

The complexity attributed to the development of any OD or OF formulation versus traditional delivery methods will no doubt extend to commercial considerations, which will generally lead to strong assertions of economic impracticality. For example, commercial manufacture of an OD formulation might be difficult and expensive, while the cost of the specialty formulation components might also be comparatively high versus those used in aqueous delivery systems. Therefore, when weighing up the foreseeable benefit for the use of an OD or an OF formulation versus the use of existing aqueous formulations used in conjunction with oil-based additives, one would likely only foresee a small labour benefit i.e., the need to handle one product rather than two. This leads to a sense of impracticality and even disadvantage.

Additionally, for an OD or an OF formulation to be optimally efficacious, it will also preferably contain a significant concentration of non-aqueous media, preferably an oil, where the concentration of the oil relative to the remaining components that facilitate effective delivery of the formulation, such as one or more emulsifying agent co-solvent, is significantly higher. However, high concentrations of oil, particularly mineral or base oils, are generally detrimental to formulation stability, owing to their low-polarity and the resultant impact upon the performance of functional formulation auxiliaries, such as dispersants and rheology modifiers, for example. In addition, one of the key dilemmas faced when developing OD formulations is that surfactants, particularly surfactant emulsifying agents, which allow for suitable stable dilution in water prior to application, are often antagonistic to stability. This leads to additional impracticality where development of sufficiently stable OD formulations, that promise effective efficacy traits through incorporation of oil at, or close to, the allowable limit, can be extremely difficult.

Indeed, the present inventor has encountered exceptional difficulty in stabilising thidiazole-urea plant growth regulators, such as thidiazuron, when suspended in the desired oil-rich carrier, where an array of destabilisation phenomena tends to result in compositions, which are not fit for consideration. The present inventor therefore sought to prepare useful compositions comprising a plant growth regulator. Additionally, in the past, thidiazuron, or mixtures of thidiazuron with diuron, appear to have been inefficiently applied and more than was actually required for optimal efficacy has been used, resulting in wastage. This has had disadvantageous consequences from an environmental and an economical perspective.

Surprisingly, the present inventor has now discovered a method to afford substantially stable and homogeneous co-formulations, which have allowed for a significant reduction in total agrochemical input, as well as a reduction in the amount of active compound required for efficacy, particularly when used in defoliation applications. It had been assumed that there would be little difference in defoliation rate and efficiency regardless of whether an oil was applied as part of a co-formulation diluted into a spray liquor, or as an individual spray oil composition jointly applied into a spray liquor with another composition containing a defoliation agent. Such an improved synergistic effect was not foreseeable from the above-described prior art. This reduction provides advantages relating to a reduced agrochemical footprint.

The present invention seeks to overcome, or at least substantially ameliorate, some of the disadvantages and shortcomings of the prior art.

SUMMARY OF THE INVENTION

According to the present invention, there is provided an agricultural co-formulation comprising:

i) an effective amount of at least one plant growth regulator, or at least one plant growth regulator and an additional biologically active ingredient, in a comminuted form having an average particle size in the range of from 1 to 12 microns;
ii) at least one oil;
iii) at least one oil-soluble surfactant dispersing agent; and
iv) at least one emulsifying agent,
wherein the final concentration of the at least one plant growth regulator, or the at least one plant growth regulator and the additional biologically active ingredient, is optionally adjusted by adding additional oil and one or more rheology modifiers and/or activation agents as required to substantially stabilise the co-formulation; and wherein the efficacy of the plant growth regulator is substantially maintained or improved.

The form of the co-formulation of the present invention may be selected from an oil dispersion ("OD") concentrate, an oil-miscible flowable ("OF") concentrate, an oil-based suspension concentrate ("SC"), or an oil-based suspoemulsions ("SE"). When used for defoliation purposes, the co-formulation is an oil-based dispersion concentrate, i.e. an OD formulation.

The term "effective amount" means an amount of a component of the co-formulation according to the invention that is sufficient for enhancing the plant growth, yield and/or vigor and that does not entail any appreciable symptom of phytotoxicity for the plant or crop. Such an amount can vary within a wide range depending on the type of plant or crop, the climatic conditions and the components included in the co-formulation according to the invention. This amount can be determined by systematic field trials that are within the capabilities of a person skilled in the art.

As used herein, the term "plant growth regulator" includes compounds eliciting a response in terms of plant organ number modulation in a dose-dependent manner. Plant organ number modulation refers to the enhancement or inhibition of plant organ growth or development. Inhibition may be complete blockage or partial blockage. For instance, plant organ number modulation can relate to inhibition of shoot branching or enhancement of root formation. Shoot branching means the process of outgrowth of axillary or adventitious buds, resulting in the formation of vegetative shoots, flowers or inflorescences. Inhibition means to permanently or temporarily suppress the growth of buds or inhibit the formation of roots. The inhibition can be complete, by affecting all axillary/adventitious buds, or partial, affecting only a subset of axillary/adventitious buds.

Examples of plant growth regulators, which may be used in accordance with the invention include, but are not limited to, antiauxins, such as clofibric acid or 2,3,5-tri-iodobenzoic acid; auxins, such as 4-CPA, 2,4-D, 2,4-DB, 2,4-DEP, dichlorprop, fenoprop, IAA, I BA, naphthaleneacetamide, α-naphthaleneacetic acid, 1-naphthol, naphthoxyacetic acid, potassium naphthenate, sodium naphthenate, 2,4,5-T; cytokinins, such as 2iP, benzyladeine kinetin, zeatin; defoliants, such as calcium cyanamide, dimethipin, endothal, ethephon, merphos, metoxuron, pentachlorophenol, thidiazuron, tribufos; ethylene inhibitors, such as aviglycine and 1-methylcyclopropene; ethylene releasers, such as ACC, etacelasil, ethephon and glyoxime; growth inhibitors, such as abscisic acid, ancymidol, butralin, carbaryl, chlorphonium, chlorpropham, dikegulac, flumetralin, fluoridamid, fosamine, glyphosine, isopyrimol, jasmonic acid, maleic hydrazide, mepiquat, piproctanyl, prohydrojasmon, propham, 2,3,5-tri-iodobenzoic acid; morphactins, such as chlorfluren, chlorflurenol, dichlorflurenol, flurenol; growth retardants/ modifiers, such as chlormequat, daminozide, flurprimidol, mefluidide, paclobutrazol, cyproconazole, tetcyclacis, uniconazole, ancymidol, trinexapac-ethyl, and progexadione-CA; growth stimulators, such as brassinolide, forchlorfenuron, hymexazol, 2-amino-6-oxypurine derivatives, indolinone derivatives, 3,4-disubstituted maleimide derivatives and fused azepinone derivatives. The term also includes other active ingredients such as benzofluor, buminafos, carvone, ciobutide, clofencet, cloxyfonac, cyclanilide, cycloheximide, epocholeone, ethychlozate, ethylene, fenridazon, heptopargil, holosulf, inabenfide, karetazan, lead arsenate, methasulfocarb, prohexadione, pydanon, sintofen, triapenthenol, and trinexapac. Plant growth regulators, such as indolinone derivative plant stimulators, described in WO 2005/107466; 3,4-disubstituted maleimide derivatives described in WO 2005/107465; fused azepinone derivatives described in WO 2005/107471; and 2-amino-6-oxypurine derivatives described in WO 2005/107472 are also included in the term.

The term "plant" or "crop" as referred to herein may be any plant or crop in plantation or in culture, especially agricultural crops, horticultural crops or silvicultural crops, and more preferably, cotton plants, including transgenic cotton plants.

According to one preferred aspect of this invention, the plant growth regulator is thidiazuron. In a particularly preferred embodiment of the co-formulation, thidiazuron is present in a concentration range of from 1 to 500 g/L, or more preferably, from 1 to 250 g/L, or more preferably, from 1 to 200 g/L, or more preferably, from 1 to 150 g/L, or more preferably, from 1 to 120 g/L, or more preferably, from 1 to 100 g/L, or more preferably, from 1 to 80 g/L, or more preferably, from 1 to 50 g/L, or more preferably, from 1 to 30 g/L, or more preferably, from 1 to 20 g/L, or more preferably, from 50 to 100 g/L, or more preferably, from 50 to 150 g/L, or more preferably, from 100 to 150 g/L, or more preferably, from 100 to 200 g/L, or more preferably, from 150 to 250 g/L. In a most preferred form, thidiazuron is present in a concentration range of from 60 to 120 g/L and most preferably, in a concentration of 100 g/L. Where the plant growth regulator is other than thidiazuron, the plant growth regulator is present in a concentration range of from 1 to 500 g/L, or more preferably, from 1 to 200 g/L, or more preferably, from 1 to 120 g/L, or further more preferably, from 1 to 100 g/L.

In another preferred form of the invention, the co-formulation further comprises at least one additional biologically active ingredient selected from a fungicide; an insecticide; an herbicide; a miticide; a nematocide; a molluscicide; an algicide; or a pesticide; or any mixture thereof. While any co-formulation comprising a combination of thidiazuron and any one or more of the above-listed additional biologically active ingredient/s is included within the scope of the present invention, in one preferred form of the invention, the co-formulation comprises thidiazuron in combination with a fungicide. In another preferred form, the co-formulation comprises thidiazuron in combination with an insecticide. In yet another preferred form, the co-formulation comprises thidiazuron in combination with a miticide. In yet another preferred form, the co-formulation comprises thidiazuron in combination with a nematocide. In yet another preferred form, the co-formulation comprises thidiazuron in combination with a molluscicide. In a most preferred form of the invention, the co-formulation comprises thidiazuron in combination with an herbicide.

In a particularly preferred embodiment of the co-formulation, the additional biologically active ingredient is present in a concentration range of from 1 to 250 g/L, or more preferably, from 1 to 100 g/L, or more preferably, from 1 to 80 g/L, or more preferably, from 1 to 60 g/L, or more preferably, from 1 to 50 g/L, or more preferably, from 1 to 30 g/L, or more preferably, from 1 to 20 g/L, or more preferably, from 80 to 100 g/L, or more preferably, from 50 to 100 g/L, or more preferably, from 50 to 80 g/L, or more preferably, from 30 to 50 g/L, or more preferably, from 20 to 30 g/L. The concentration of the additional biologically active ingredient is most preferably selected from 48, 30 or 15 g/L, respectively. In the most preferred form, the additional biologically active ingredient is present in a concentration of 30 g/L.

Where the additional biologically active ingredient is preferably at least one herbicide, it may be selected from, but is not to be taken as being limited to: a dinitroaniline herbicide; a diphenylether herbicide; a phenoxypropionate herbicide; and including atrazine, nicosulfuron, carfentrazone, naptalam, 2,4-D, quizalofop, benefin, bentazon, prometryn, mesotrione, flumioxazin, clomazone, ethalfluralin, napropamide, diquat, s-metolachlor, ametryn, dimethenamid, fluazifop, oxyfluorfen, paraquat, topramezone, diuron, pronamide, alachlor, tembotrione, linuron, rimsulfuron, sethoxydim, bensulide, pendimethalin, pyrazon, cycloate, glyphosate, maleic hydrazide, halosulfuron, pelargonic acid, clethodim, metribuzin, rimsulfuron, terbacil, ethalfluralin, phenmedipham, clopyralid, a combination of clomazone and ethalfluralin, MCPB, pebulate, trifluralin, or any mixtures thereof. While any co-formulation comprising a combination of thidiazuron and any of the above-listed herbicides is included within the scope of the present invention, in a most preferred form, the herbicide is diuron.

When the co-formulation comprises a combination of thidiazuron and diuron, thidiazuron is preferably present in a concentration range of from 1 to 250 g/L, or more preferably, from 1 to 200 g/L, or more preferably, from 1 or 100 g/L, or more preferably, from 1 to 80 g/L, or more preferably, from 1 to 50 g/L, or more preferably, from 1 to 30 g/L, or more preferably, from 1 to 20 g/L and most preferably, in a concentration of 60 g/L; and diuron is preferably present in a concentration range of from 1 to 250 g/L, or more preferably, from 1 to 100 g/L, or more preferably, from 1 to 80 g/L, or more preferably, from 1 to 60 g/L, or more preferably, from 1 to 50 g/L, or more preferably, from 1 to 30 g/L, or more preferably, from 1 to 20 g/L, or more preferably, from 50 to 80 g/L, or more preferably, from 30 to 50 g/L, or more preferably, from 20 to 30 g/L. The concentration of diuron is most preferably selected from 48, 30 or 15 g/L, respectively. In the most preferred form, diuron is present in a concentration of 30 g/L.

Where thidiazuron is present in the co-formulation of the present invention on its own, or when combined with diuron as the biologically active ingredient, the co-formulation has been found to display surprisingly synergistic defoliation efficacy on crops, when compared to existing defoliants used in accordance with existing defoliation practices.

It is essential that the plant growth regulator and/or the active ingredient be finely divided via, for example, comminution or other means for the purposes of ensuring that the dispersion concentrate is maintained in a substantially stable form. For comminution of even finer particle size ranges, machines like the ball mill, vertical roller mill, hammer mill, roller press or high compression roller mill, vibration mill, jet mill and the like can be used. For yet finer particle sizes, which are sometimes referred to as "ultrafine grinding", specialist mills can be used. The comminution of the at least one plant growth regulator, or at least one plant growth regulator and an additional biologically active ingredient, of the present invention results in an average particle size of the components in the range of from 1 to 12 microns, or more preferably, of from 1 to 8 microns, or even more preferably, of from 1 to 6 microns. In a most preferred embodiment of the present invention, comminution may be carried out using wet grinding via a horizontal mill, for example, one supplied by Engineered Mills, Inc. of Grayslake, Illinois, to produce a co-formulation with an average (d0.5) particle size of less than 5 microns, with the particle size analysis being determined by microscopic approximation, or by the use of an acceptable Grind Gauge or Hegman Gauge.

The at least one oil, which forms the continuous phase of the co-formulation, is preferably selected from a paraffin oil, such as a kerosene, for example, one of the EXXSOL® D range available from ExxonMobil Chemical Company of Spring, Texas; YUBASE 3® available from SK Corporation of Seoul, Republic of Korea; PROPAR®12 available from Caltex; JEFFSOL® AG 1555 solvent available from Huntsman Corporation; a seed oil, such as methyl and ethyl oleate, methyl and ethyl soyate and their corresponding fatty acids; an aromatic hydrocarbon, such as an alkyl benzene and an alkyl naphthalene, such as SOLVESSO® 150 available from ExxonMobil Chemical Company; a polyalkylene glycol ether; a fatty acid diester; a fatty alkylamide or diamide; a dialkylene carbonate; a ketone; an alcohol; or any mixtures thereof. In a most preferred form of the invention, the at least one oil is selected from any Group 2 or 3 Base Oil, as defined by corresponding Viscosity Indexes. In a preferred embodiment, the at least one oil is used in a concentration range of from 1 to 700 g/L, or more preferably, of from 100 to 700 g/L, or more preferably, of from 100 to 450 g/L, or more preferably, of from 100 to 300 g/L, or more preferably, of from 1 to 450 g/L, or more preferably, of from 300 to 450 g/L, or even more preferably, of from 450 to 700 g/L. In the most preferred embodiments, the at least one oil is used in a concentration of greater than 500 g/L.

The addition of at least one oil-soluble surfactant dispersing agent, which assists with maintaining the dispersion concentrate in a substantially stable form, is preferably selected from a fatty acid-polyalkylene glycol condensate, such as TERSPERSE® 2510 dispersant; or a polyamine-fatty acid condensate, such as TERSPERSE® 4850 dispersant or TERSPERSE® 4890 dispersant; a random polyester condensate, such as TERSPERSE® 2520 dispersant; and a salt of a polyolefin condensate, such as TERSPERSE® 2422 dispersant, which are all products of Huntsman Corporation. More preferably, the at least one dispersing agent is a condensation product of the reaction of polyalkylene glycol or polyalkylene glycol ether and a fatty acid, such as TERSPERSE® 2510 dispersant or a random polyester condensate, such as TERSPERSE® 2520 dispersant. The surfactant dispersing agent is used in a concentration range of from 1 to 70 g/L, or more preferably, of from 1 to 40 g/L, or more preferably, of from 40 to 70 g/L, or more preferably, of from 1 to 15 g/L. The term "condensate" as used herein refers to the reaction product of a condensation reaction following the elimination of water or a small molecule, or to the reaction product of an addition reaction.

The co-formulation of the present invention further preferably comprises at least one rheology modifier to overcome the strong tendency of the finely dispersed plant growth regulator when on its own or when in combination with the active ingredient, or the dispersed phase, to settle or consolidate over time. The rheology modifier is used in an amount of from 1 to 20 g/L, or more preferably, of from 1 to 15 g/L, or more preferably, of from 1 to 10 g/L, or more preferably, of from 1 to 5 g/L. If required, the at least one rheology modifier is preferably selected from fumed silica, both hydrophobic and hydrophilic variants, such as one provided by the AEROSIL® range from EVONIK; a gelling clay, such as one provided by the hydrophobic members of the BENTONE® range from ELEMENTIS®, and more particularly, either BENTONE® 38, a hydrophobically modified hectorite clay, or BENTONE® SD-1, a hydrophobically modified organic derivative of bentonite; a triglyceride or other fatty acid ester of glycerol; a rubber-type copolymer, particularly one containing styrene residues, such as styrene-butadiene co-polymers, such as KRATON® G1701, available from KRATON Corporation; and a copolymer, block or otherwise, such as a polyester and/or a polyamides. More preferably, the rheology modifier is BENTONE® SD-1, or even more preferably, the combination of BENTONE® SD-1, a hydrophobically modified organic derivative of bentonite, which is used in an amount of from 1 to 20 g/L, or more preferably, of from 1 to 15 g/L, or more preferably, of from 1 to 10 g/L; and AEROSIL® 200, a hydrophilic fumed silica, which is used in an amount of from 1 to 40 g/L, or more preferably, of from 1 to 20 g/L, or more preferably, of from 1 to 10 g/L, or more preferably, of from 1 to 5 g/L.

Where a rheology modifier is used, the co-formulation may further comprise at least one secondary activation agent to yield optimal performance. Where the secondary activation agent comprises a gelling clay, the addition of polar solvents including water, methanol, ethanol, propylene carbonate, or any mixtures thereof may be required. Further, where a rheology modifier is used, the co-formulation may further preferably comprise at least one secondary activation agent to facilitate highly improved rheological modification performance.

The co-formulation preferably further comprises at least one inert solid filler, including, but not limited to, titanium dioxide, such as TIONA 625 available from CRISTAL Global and one or more rheologically inactive phyllosilicates, which can also act as activation agents that assist in stabilising the co-formulation.

Since the co-formulation of the present invention exists as a continuous phase in oil/s, the choice of an emulsifying agent is somewhat governed by the type of oil/s used as the continuous phase. Generally, an emulsifying agent having a low hydrophobic-lipophobic balance ("HLB") is most suitable. The HLB required for most oil phases used in the present co-formulation is usually below 10. Such an emulsifying agent is preferably selected from one or more alkoxylated fatty alcohol/s, sorbitan ester/s and their corresponding ethoxylate/s, ethoxylated fatty acid/s, ethoxylated castor oil/s, calcium and ammonium and alkylammonium salts of alkylbenzene sulphonate, alkylsulphosuccinate salt/s, ethylene oxide-propylene oxide block copolymer/s, ethoxylated alkylamine/s and ethoxylated alkyl phenol/s, or any mixtures thereof.

When the co-formulation comprises thidiazuron, or thidiazuron in combination with diuron, the at least one emulsifying agent is most preferably selected from the group of castor oil ethoxylates, in particular, TERMUL® 3201 emulsifier, TERMUL® 3512 emulsifier; alcohol ethoxylates, in particular, TERIC® 12A3N, 12A4N, 13A7, 13A9, 17A2 and SURFONIC® TDA-6; alcohol alkoxylates, such as TERMUL® 5429, 5459 and 5500; fatty acid ethoxylates, such as TERIC® OF6; sorbitan ester ethoxylates, such as ECOTERIC® T85; a sulphosuccinate, such as TERMUL® 3665 emulsifier, all of which are available from Huntsman Corporation; and amine and calcium salts of dodecylbenzene sulphonate, such as the NANSA® EVM range of products available from INNOSPEC Inc. The most preferred emulsifying agent comprises any one or any combination of calcium salt of dodecylbenzene sulphonate, at least one alcohol alkoxylate, and sorbitan ester ethoxylate in an amount of from 1 to 300 g/L, or more preferably, of from 1 to 250 g/L, or more preferably, of from 1 to 175 g/L, or more preferably, of from 1 to 150 g/L, or more preferably, of from 175 to 250 g/L, or more preferably, of from 150 to 175 g/L, or more preferably, of from 100 to 150 g/L, or more preferably, of from 1 to 100 g/L.

Since the co-formulation of the present invention exists as a continuous phase in oil/s, which may further be diluted in water as facilitated by the presence of an emulsifying agent/s, the invention may further comprise water-soluble surfactant dispersing agents that help maintain the pre-broadcast aqueous dispersion in a substantially stable form. If required, the at least one water-soluble surfactant dispersing agent is preferably selected from, but not limited to, sodium or ammonium salts of alkyl naphthalene sulphonate formaldehyde condensates, such as TERSPERSE® 2020; sodium, calcium and ammonium salts of lignosulphonates; sodium or ammonium salts of co-polymers, such as TERSPERSE® 2700; sulfonates of cumene or xylene, such as the ELTESOL SC or SX range of products available from INNOSPEC Inc.

The scope of the present invention further extends to a method of preparing the co-formulation of the invention comprising the following steps, wherein steps c) and d) may be carried out in any order or simultaneously:
a) comminuting at least one plant growth regulator, or at least one plant growth regulator and an additional biologically active ingredient, to achieve an average particle size in the range of from 1 to 12 microns;
b) adding the comminuted at least one plant growth regulator, or at least one plant growth regulator and an additional biologically active ingredient, to at least one oil either by stirring or high-shear mixing to create an oil dispersion;
c) adding at least one oil-soluble surfactant dispersing agent to the oil dispersion;
d) adding at least one emulsifying agent to the oil dispersion; and optionally
e) adjusting the temperature of the oil dispersion to between about 60° C. and 70° C. with stirring; and optionally
f) adjusting the final concentration of at least one plant growth regulator, or at least one plant growth regulator and an additional biologically active ingredient, in the dispersion by adding additional oil and one or more rheology modifiers and/or activation agents as required to substantially stabilise the co-formulation.

The scope of the present invention further extends to an alternative method of preparing the co-formulation of the invention comprising the following steps wherein steps e) and f) may be carried out in any order or simultaneously:

a) combining at least one rheology modifying agent/s with at least one oil;
b) adding at least one plant growth regulator, or at least one plant growth regulator and an additional biologically active ingredient, to the oil from step a) either by stirring or high-shear mixing to create an oil dispersion;
c) adding at least one activation agent to further develop a desired stability behaviour of the oil dispersion;
d) comminuting the oil dispersion of step c) to achieve an average particle size of the at least one plant growth regulator, or at least one plant growth regulator and an additional biologically active ingredient, in the range of from 1 to 12 microns;
e) adding at least one oil-soluble surfactant dispersing agent to the oil dispersion;
f) adding at least one emulsifying agent to the oil dispersion; and optionally
g) adjusting the temperature of the oil dispersion to between about 60° C. and 70° C. with stirring; and optionally
h) adjusting the final concentration of at least one plant growth regulator, or at least one plant growth regulator and an additional biologically active ingredient, in the dispersion by adding additional oil and one or more additional rheology modifiers and/or activation agents as required to substantially stabilise the co-formulation.

The scope of the present invention extends to a further preferred method of preparing the co-formulation of the invention comprising the following steps:

a) adding at least one oil-soluble surfactant dispersing agent to at least one oil;
b) adding at least one plant growth regulator, or at least one plant growth regulator and an additional biologically active ingredient, to the oil either by stirring or high-shear mixing to create an oil dispersion;
c) adding at least one activation agent to further develop a desired stability behaviour of the oil dispersion;
d) comminuting the oil dispersion of step c) to achieve an average particle size of the at least one plant growth regulator, or at least one plant growth regulator and an additional biologically active ingredient, in the range of 1 to 12 microns; and optionally
e) adjusting the temperature of the oil dispersion to between about 60° C. and 70° C. with stirring; and optionally
f) adjusting the final concentration of at least one plant growth regulator, or at least one plant growth regulator and an additional biologically active ingredient, in the dispersion by adding additional oil, at least one emulsifying agent, and one or more rheology modifiers and/or at least one other activation agents as required to substantially stabilise the co-formulation.

In a most preferred form, the present invention provides a method of preparing a substantially homogenous and stable co-formulation comprising the following steps, wherein steps a) to d) are carried out before or after steps e) to g) and before step h):

a) adding at least one oil-soluble surfactant dispersing agent to at least one first oil;
b) adding an effective amount of at least one plant growth regulator, or at least one plant growth regulator and an additional biologically active ingredient, in the oil with stirring or high-shear mixing to create an oil dispersion;
c) adding at least one activating agent to further develop a desired stability behaviour of the oil dispersion;
d) comminuting the oil dispersion of step c) to produce a substantially homogeneous first dispersion concentrate wherein at least one plant growth regulator, or at least one plant growth regulator and an additional biologically active ingredient, has an average particle size in the range of 1 to 12 microns;
e) dispersing at least one rheology modifier in at least one second oil by stirring or high-shear mixing to form a second substantially homogeneous dispersion concentrate in the form of a gel;

f) adding at least one solvent to the second dispersion concentrate with continued stirring or high-shear mixing to form an improved gel;

g) dispersing at least one oil-soluble surfactant dispersing or emulsifying agent into the improved gel by stirring or high-shear mixing to form a second substantially homogeneous dispersion concentrate;

h) adding at least one other rheology modifier to the gel of step g) under low-shear mixing to form a pre-mix carrier; and i) adding an amount of the first dispersion concentrate to an amount of the pre-mix carrier to obtain the substantially homogenous and stable co-formulation.

It is noteworthy that the improved gel in step f) occurs once the emulsifying agent has been added. The gel is improved in that while it maintains similar rheological traits, it is easier to handle having a lower viscosity which allows for better mixing in step (i). It is also thermodynamically preferable to form a stable second dispersion concentrate, which assists in substantially avoiding the unwanted side-effects of adding concentrated emulsifiers to the millbase pre-mix.

The scope of the present invention also extends to a method for applying the present co-formulation to a crop requiring defoliation, whereby it is expected that the synergistic benefit of co-formulating at least one plant growth regulator, or at least one plant growth regulator in combination with an additional biologically active ingredient, with at least one oil, may yield benefits with respect to improved formulation efficiency and biological efficacy. More particularly, the present inventor has found that the application of the co-formulation of the present invention when used as a defoliant maintains or yields improvements in defoliation efficiency in crops and in particular, in cotton crops.

It has been found that, due to the improved delivery or application of the co-formulation of the present invention, less of the plant growth regulator on its own, or in combination with the additional biologically active ingredient, is/are required. In addition, the co-formulation of the present invention removes the need to apply or mix the at least one plant growth regulator and/or the at least one active ingredient separately as has been done in the past, which is advantageous from a handling and ease-of-use perspective. Due to the synergism that exists between at least one plant growth regulator, or at least one plant growth regulator in combination with an additional biologically active ingredient and the at least one oil, the present invention therefore results in substantially improved efficiency of defoliation.

The scope and findings of this invention is not to be limited solely to the use of oil-based dispersion co-formulations for defoliation purposes on, for example, cotton crops. It is expected that the synergism shown by the compositions described may also transfer to broader and less specific applications of pesticides. These include, but are not limited to, the application of oil-based suspension co-formulations containing a plant growth regulator, a fungicide, an insecticide, an herbicide, a miticide, a nematocide, a molluscicide, an algicide, or other pesticide, or any mixtures thereof.

The following descriptions relate only to specific embodiments of the present invention and are in no way intended to limit the scope of the present invention to those specific embodiments. In particular, the following description is exemplary rather than limiting in nature. Variations and modifications to the disclosed methods that do not necessarily depart from the essence of this invention may become apparent to those skilled in the art.

BRIEF DESCRIPTION OF THE FIGURES

In order that the present invention can be understood and put into practical effect, FIG. 1 illustrates the results of flow assessments conducted on particular examples, which show rheological features attributed to dispersion instability. This instability has been linked to further catastrophic destabilisation phenomena exhibited by complete co-formulation examples, and highlights the significant improvements afforded by the present invention which surprisingly manage to diminish the unwanted effects of these challenges.

DETAILED DESCRIPTION OF THE INVENTION

The invention will now be described with reference mainly to oil-based co-formulations comprising thidiazuron, as the plant growth regulator, or thidiazuron, as the plant growth regulator, and diuron, as the biologically active ingredient. It is anticipated that similar results can be found for suspension formulations in oil of other solid plant growth regulators or biologically active ingredients, which are not soluble in the continuous oil phase.

When the co-formulation comprises thidiazuron on its own in oil, thidiazuron is most preferably present in a concentration range of 1 to 250 g/L, or more preferably, from 1 to 200 g/L, or more preferably, from 1 or 100 g/L, or more preferably, from 1 to 80 g/L, or more preferably, from 1 to 50 g/L, or more preferably, from 1 to 30 g/L, or more preferably, from 1 to 20 g/L and most preferably, in a concentration of 60 g/L.

When the co-formulation comprises a combination of thidiazuron and diuron, thidiazuron is most preferably present in a concentration range of 1 to 250 g/L, or more preferably, from 1 to 200 g/L, or more preferably, from 1 or 100 g/L, or more preferably, from 1 to 80 g/L, or more preferably, from 1 to 50 g/L, or more preferably, from 1 to 30 g/L, or more preferably, from 1 to 20 g/L and most preferably, in a concentration of 60 g/L; and diuron is preferably present in a concentration range of from 1 to 250 g/L, or more preferably, from 1 to 100 g/L, or more preferably, from 1 to 80 g/L, or more preferably, from 1 to 60 g/L, or more preferably, from 1 to 50 g/L, or more preferably, from 1 to 30 g/L, or more preferably, from 1 to 20 g/L, or more preferably, from 50 to 80 g/L, or more preferably, from 30 to 50 g/L, or more preferably, from 20 to 30 g/L. The concentration of diuron is most preferably selected from 48, 30 or 15 g/L, respectively. In the most preferred form, diuron is present in a concentration of 30 g/L.

In a most preferred form of the invention, the at least one oil is a Group 3 Base Oil with a Viscosity Index of between 110 and 120, which is used in a concentration range of 450 to 700 g/L.

The at least one oil-soluble surfactant dispersing agent is most preferably a condensation product of the reaction of polyalkylene glycol or polyalkylene glycol ether and a fatty acid, such as TERSPERSE® 2510 dispersant, or a random polyester condensate, such as TERSPERSE® 2520 dispersant, which is used in a concentration range of from 1 to 70 g/L, or more preferably, of from 1 to 40 g/L, or more preferably, of from 40 to 70 g/L, or more preferably, of from 1 to 15 g/L.

The at least one emulsifying agent required for the co-formulation comprising thidiazuron, or thidiazuron and diuron, is most preferably selected from the group of sorbitan ester ethoxylates, in particular, ECOTERIC™ T85 fatty acid ethoxylate; alcohol alkoxylates, such as TER-MUL® 3201, 5429, 5459 and 5500 emulsifiers; alcohol ethoxylates, in particular, TERIC® 12A3N and TERIC® 13A7 fatty acid ethoxylates, most of which are available from Huntsman Corporation; and amine and calcium salts of dodecylbenzene sulphonate, such as the NANSA® EVM range of surfactant products, and more preferably, NANSA® EVM 70/2E surfactant. The most preferred emulsifying agent is the combination of at least one or any calcium salt of dodecylbenzene sulphonate, at least one alcohol alkoxylate, and sorbitan ester ethoxylate, each in amount of from 1 to 175 g/L.

Where a rheology modifier is required, the most preferred is a hydrophobically modified organic derivative of bentonite, namely, BENTONE® SD-1, or more preferably the combination of a hydrophobically modified organic derivative of bentonite, namely, BENTONE® SD-1, which is used in an amount of from 1 to 20 g/L, or more preferably, of from 1 to 15 g/L, or more preferably, of from 1 to 10 g/L; and a hydrophilic fumed silica, AEROSIL® 200, which is most preferably used in an amount of from 1 to 20 g/L.

The secondary activation agent, which may be required to yield further improved performance, is most preferably selected from a gelling clay, which may also require the addition of polar solvents including water, methanol, ethanol, propylene carbonate, or any mixtures thereof.

BRIEF DESCRIPTION OF THE EXAMPLES

A typical oil dispersion formulation known in the art has a composition as described in Table A below.

TABLE A

Typical Components required for an Oil Dispersion Formulation:

| Component | Typical amount, % w/w* | Purpose |
| --- | --- | --- |
| Active ingredient | <60 | As a toxicant |
| Dispersant (oil-soluble) | <8 | To prevent particle aggregation |
| Emulsifier | 5-20 | To emulsify the oil phase when the formulation is added to water |
| Anti-settling and structuring agents | 0.5-5 | To prevent sedimentation and syneresis |
| Oil | balance | To form a continuous phase |

*where the total amount of all the components adds up to 100%.

Example 1—Comparative Example A

The below Table 1 provides an example of a typical commercial aqueous suspension concentrate ("SC") containing thidiazuron:

TABLE 1

| Components | g/L |
| --- | --- |
| Thidiazuron | 500 |
| Dispersing Agent/s | 10-50 |
| Wetting Agent/s | 10-20 |
| Humectant | 50-100 |
| Antifoam | 1-10 |
| Xanthan gum | 0.1-0.5 |
| Biocidal agent | 0.05-0.25 |
| Water | To volume. |

Such a formulation would be prepared in a manner familiar to those skilled in the art.

Example 2—Comparative Example B

Table 2 below provides an example of a commercial aqueous suspension concentrate ("SC") containing both diuron and thidiazuron:

TABLE 2

| Components | g/L |
| --- | --- |
| Diuron | 60 |
| Thidiazuron | 120 |
| Dispersing Agent/s | 10-50 |
| Wetting Agent/s | 10-20 |
| Humectant | 50-100 |
| Antifoam | 1-10 |
| Xanthan gum | 0.1-0.5 |
| Biocidal agent | 0.05-0.25 |
| Water | To volume. |

Such a formulation would be prepared in a manner familiar to those skilled in the art.

Example 3—Initial Example of the Co-Formulation of the Present Invention and as Exemplified in-Field An oil-based suspension co-formulation of diuron and thidiazuron according to the present invention was prepared as follows:

TABLE 3

| Components | g/L |
| --- | --- |
| Diuron | 15.00 |
| Thidiazuron | 30.00 |
| TERSPERSE ® 2510 dispersant | 30.00 |
| TERMUL ® 3201 emulsifier | 100.00 |
| NANSA ® EVM 70/2E surfactant | 20.00 |
| TERMUL ® 5459 emulsifier | 20.00 |
| BENTONE ® 38 | 7.50 |
| JEFFSOL ® AG 1555 solvent | 2.47 |
| YUBASE 3 ® | To volume. |

Firstly, a pre-mix 'masterbatch' of activated hydrophobically-modified hectorite was prepared via the dispersion of 10 g BENTONE® 38 (ELEMENTIS) in 86.66 g of YUBASE via a SILVERSON high-shear mixer. To the resultant homogeneous dispersion, 3.34 g JEFFSOL® AG 1555 was added with continued shear until a homogeneous gel-like substance was afforded. This was set aside.

Then, as per Table 3, the required amount of TERSPERSE® 2510 dispersant was dissolved in an amount of YUBASE 3® that would allow for a thidiazuron concentration in the vicinity of 7% w/w. Diuron and thidiazuron technical were then dispersed in the resultant mixture under high-shear using a SILVERSON mixer. This was continued until a homogeneous mixture was afforded.

This slurry was then comminuted using an horizontal mill (Engineered Mills, Inc.) to produce a concentrate containing components having an average (d0.5) particle size of less than 5 μm. Particle size analysis was determined by microscopic approximation.

To the concentrate, TERMUL® 3201 emulsifier, NANSA® EVM 70/2E surfactant, TERMUL® 5459 emulsifier and the pre-prepared rheology modifier, prepared as described above, were added, followed by the remaining quantity of YUBASE 3®. The resulting oil-based suspension was then homogenised via low to moderate shear mixing. The composition was then observed as displaying satisfactory stability and dilution behaviour. This is also an example of the methodology of adding a rheology modifier post-comminution.

Example 4—Higher-Loading Variant of Example 3 and Exemplified in-Field

An oil-based suspension co-formulation of diuron and thidiazuron according to the present invention was prepared as follows:

TABLE 4

| Components | g/L |
| --- | --- |
| Diuron | 30.00 |
| Thidiazuron | 60.00 |
| TERSPERSE ® 2510 dispersant | 40.00 |
| TERMUL ® 3201 emulsifier | 100.00 |
| NANSA ® EVM 70/2E surfactant | 20.00 |
| BENTONE ® 38 | 0.57 |
| JEFFSOL ® AG 1555 solvent | 0.19 |
| YUBASE 3 ® | To volume. |

As per Table 4, the required amount of TERSPERSE® 2510 dispersant was dissolved in an amount of YUBASE 3® that would allow for a thidiazuron concentration in the vicinity of 12% w/w. Diuron and thidiazuron technical were then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopic approximation.

To the concentrate, TERMUL® 3201 emulsifier, and NANSA® EVM 70/2E surfactant and the pre-prepared rheology modifier (described in EXAMPLE 3) were added, followed by the remaining quantity of YUBASE 3®. The resulting oil-based suspension was then homogenised via low to moderate shear mixing. The composition was then shown to display satisfactory stability and dilution behaviour. This is another example of the methodology of adding rheology modifiers post-comminution.

Example 5—Thidiazuron-Only Example and Exemplified in-Field

An oil-based suspension co-formulation of thidiazuron according to the present invention was prepared as follows:

TABLE 5

| Components | g/L |
| --- | --- |
| Thidiazuron | 100.00 |
| TERSPERSE ® 2510 dispersant | 40.00 |
| TERMUL ® 3201 emulsifier | 100.00 |
| NANSA ® EVM 70/2E surfactant | 20.00 |
| BENTONE ® 38 | 0.50 |
| JEFFSOL ® AG 1555 solvent | 0.17 |
| YUBASE 3 ® | To volume. |

As per Table 5, the required amount of TERSPERSE® 2510 dispersant was dissolved in an amount of YUBASE 3® that would allow for a thidiazuron concentration in the vicinity of 17 to 18% w/w. Diuron and thidiazuron technical were then dispersed in the resultant mixture under high-shear using a SILVERSON mixer. This mixing was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopy, where the dispersion displayed weak to moderate flocculation of active ingredient crystals.

To the concentrate, TERMUL® 3201 emulsifier, NANSA® EVM 70/2E surfactant and the pre-prepared rheology modifier as described in EXAMPLE 3 were added, followed by the remaining quantity of YUBASE 3®. The resulting oil-based suspension was then homogenised via low to moderate shear mixing. The composition was then observed as displaying satisfactory stability and dilution behaviour. This is another example of the methodology of adding rheology modifiers post-comminution.

Example 6

A millbase concentrate for use in the preparation of a complete oil-based suspension co-formulation of thidiazuron according to the present invention was prepared as follows:

TABLE 6

| Components | % w/w |
| --- | --- |
| Thidiazuron | 20.00 |
| TERSPERSE ® 4850 dispersant | 4.00 |
| SOLVESSO 150 | 2.00 |
| YUBASE 3 ® | Balance |

As per Table 6, the required amount of TERSPERSE® 4850 dispersant was dissolved in an amount of pre-mixed YUBASE 3® and SOLVESSO 150. Thidiazuron technical was then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopy, where the dispersion displayed weak to moderate flocculation of active ingredient crystals.

Example 7

A millbase concentrate for use in the preparation of a complete oil-based suspension co-formulation of thidiazuron according to the present invention was prepared as follows:

TABLE 7

| Components | % w/w |
| --- | --- |
| Thidiazuron | 20.00 |
| TERSPERSE ® 2510 dispersant | 4.00 |
| SOLVESSO 150 | 2.00 |
| YUBASE 3 ® | To volume. |

As per Table 7, the required amount of TERSPERSE® 2510 dispersant was dissolved in an amount of pre-mixed YUBASE 3® and SOLVESSO 150. Thidiazuron technical was then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopy, where the dispersion displayed weak to moderate flocculation of active ingredient crystals.

Example 8

A millbase concentrate for use in the preparation of a complete oil-based suspension co-formulation of thidiazuron according to the present invention was prepared as follows:

TABLE 8

| Components | % w/w |
| --- | --- |
| Thidiazuron | 20.00 |
| TERSPERSE ® 2520 dispersant | 4.00 |
| SOLVESSO 150 | 2.00 |
| YUBASE 3 ® | Balance |

As per Table 8, the required amount of TERSPERSE® 2520 dispersant was dissolved in an amount of pre-mixed YUBASE 3® and SOLVESSO 150. Thidiazuron technical was then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopy, where the dispersion displayed weak to moderate flocculation of active ingredient crystals.

Example 9

A millbase concentrate for use in the preparation of a complete oil-based suspension co-formulation of thidiazuron according to the present invention was prepared as follows:

TABLE 9

| Components | % w/w |
| --- | --- |
| Thidiazuron | 20.00 |
| TERSPERSE ® 4890 | 4.00 |
| SOLVESSO 150 | 2.00 |
| YUBASE 3 ® | Balance |

As per Table 9, the required amount of TERSPERSE® 4890 dispersant was dissolved in an amount of pre-mixed YUBASE 3® and SOLVESSO 150. Thidiazuron technical was then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopy, where the dispersion displayed weak to moderate flocculation of active ingredient crystals.

Example 10

A millbase concentrate for use in the preparation of a complete oil-based suspension co-formulation of thidiazuron according to the present invention was prepared as follows:

TABLE 10

| Components | % w/w |
|---|---|
| Thidiazuron | 15.08 |
| TERMUL ® 3201 | 15.08 |
| NANSA ® EVM70/2E | 3.77 |
| TERIC ® 13A7 | 5.66 |
| SOLVESSO 150 | 4.61 |
| YUBASE 3 ® | Balance |

As per Table 10, the required amounts of TERMUL® 3201, NANSA® EVM70/2E and TERIC® 13A7 were added to an amount of YUBASE 3®. Thidiazuron technical was then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopy, where the dispersion displayed weak to moderate flocculation of active ingredient crystals.

Example 11—Comparative Rheological Assessment

Fundamental rheological examination of Examples 6 to 10 illustrates the exceptional difficulties associated with the stabilisation of thidiazuron through analysis of these simple millbase concentrates. This data highlights the existence of inherent instability of the finely divided disperse phase when suspended in the preferred concentrations of the oil-based carrier, regardless of the presence of various, common surfactant dispersing agent/s, which should typically assist with maintaining the dispersion concentrate in a substantially stable form. The present inventor has concluded that this underlying instability observed in millbase concentrates is the primary source of instability in complete co-formulations comprising thidiazuron and the desired oil.

Flow Assessment

Basic flow measurements, performed upon a Malvern Kinexus Pro Rheometer using 40 mm plate geometry, 150 μm gap, 25° C., 0.1-1.0 s$^{-1}$, (logarithmic table), illustrated in FIG. 1 below, show that the co-formulations described in EXAMPLES 6, 7 and to a lesser extent EXAMPLE 10, display rheological features attributed to dispersion instability, for example, low-shear viscosities in the region of 1-100 Pa.

EXAMPLE 8 shows significant improvement with initial measurements displaying only minor thixotropy and viscosity readings of ≪1 Pa across the measured shear rate range. After 6 days however, EXAMPLE 8 is shown to display onset of the same de-stabilising phenomena with viscosity approaching 1 Pa, or a nearly 1000-fold increase in shear viscosity.

EXAMPLE 10 is an anomalous example, which highlights further improved dispersion stability, where a lack of thixotropy and time-dependent rheological changes are displayed. However, this further improvement unexpectedly shows no benefit when utilised in the preparation of a complete composition, as exemplified by EXAMPLE 20, thus highlighting further unprecedented complexity.

Example 12—Improvement Upon Example 4

An oil-based suspension co-formulation of diuron and thidiazuron according to the present invention was prepared as follows:

TABLE 12

| Components | g/L |
|---|---|
| Diuron | 30.00 |
| Thidiazuron | 60.00 |
| TERSPERSE ® 2510 dispersant | 40.00 |
| TERMUL ® 3201 emulsifier | 100.00 |
| NANSA ® EVM 70/2E surfactant | 20.00 |
| AEROSIL ® 200 | 4.00 |
| BENTONE ® 38 | 0.25 |
| JEFFSOL ® AG 1555 solvent | 0.20 |
| YUBASE 3 ® | To volume. |

As per Table 12, the required amount of BENTONE® 38 was added to an amount of YUBASE 3®, where the latter equated to an amount that would allow for a thidiazuron concentration in the vicinity of 20%. The resultant suspension was then subject to mixing at high-shear (SILVERSON) for a specific duration, followed by drop-wise addition of JEFFSOL® AG 1555 solvent with continued shear to develop the appropriate rheology. The rate of shear was then decreased, and the required mass of AEROSIL® 200 (EVONIK) was added followed by continued shear for a specific duration. TERSPERSE® 2510 dispersant was then dissolved in the mixture ensuring homogeneity, followed by dispersion of diuron and thidiazuron technical.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopic approximation.

To the concentrate, TERMUL® 3201 emulsifier and NANSA® EVM 70/2E surfactant were added, followed by the remaining quantity of YUBASE 3®. The resulting oil-based suspension was then homogenised via low-shear (overhead stirring). The composition was shown to display satisfactory stability and dilution behaviour. This is an example of a methodology, whereby the rheology modifiers were added prior to comminution.

Example 13—Improvement Upon Example 5

An oil-based suspension co-formulation of thidiazuron according to the present invention was prepared as follows:

TABLE 13

| Components | g/L |
|---|---|
| Thidiazuron | 100.00 |
| TERSPERSE ® 2510 dispersant | 30.00 |
| TERMUL ® 3201 emulsifier | 100.00 |
| NANSA ® EVM 70/2E surfactant | 20.00 |
| AEROSIL ® 200 | 1.50 |
| BENTONE ® 38 | 0.25 |
| JEFFSOL ® AG 1555 solvent | 0.20 |
| SOLVESSO ® 150 | 5.00 |
| YUBASE 3 ® | To volume. |

As per Table 13, the required amount of BENTONE® 38 was added to an amount of YUBASE 3®, which equated to roughly 50% of the total requirement, and SOLVESSO® 150 (EXXON Chemical). The resultant suspension was then subject to mixing at high-shear (SILVERSON) for a specific duration, followed by drop-wise addition of JEFFSOL® AG 1555 solvent with continued shear to develop the appropriate rheology. The rate of shear was then decreased, and the required mass of AEROSIL® 200 (EVONIK) was added followed by continued shear for a specific duration. TERSPERSE® 2510 dispersant was then dissolved in the mixture ensuring homogeneity, followed by dispersion of thidiazuron technical.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 µm, determined by approximation using a 0 to 100 Grind Gauge, or a 8 to 0 Hegman Gauge. Particle size analysis was additionally determined by microscopic approximation.

To the concentrate, TERMUL® 3201 emulsifier and NANSA® EVM 70/2E surfactant were added, followed by the remaining quantity of YUBASE 3®. The resulting oil-based suspension was then homogenized via low-shear overhead stirring. The composition was shown to display satisfactory stability and dilution behaviour. This is an example of a methodology, whereby rheology modifiers were added prior to comminution.

Example 14

An oil-based suspension co-formulation of thidiazuron according to the present invention was prepared as follows:

TABLE 14

| Components | g/L |
|---|---|
| Thidiazuron | 100.00 |
| TERSPERSE ® 2520 dispersant | 20.00 |
| TERMUL ® 3201 emulsifier | 100.00 |
| NANSA ® EVM 70/2E surfactant | 25.00 |
| TERIC ® 13A7 emulsifier | 37.50 |
| AEROSIL ® 200 | 4.23 |
| BENTONE ® SD-1 | 14.81 |
| SOLVESSO ® 150 | 14.94 |
| YUBASE 3 ® | To volume. |

A pre-mix "masterbatch" gel was prepared via the dispersion of 14.81 g BENTONE® SD-1 (ELEMENTIS) in 80.25 g of YUBASE 3® via a SILVERSON high-shear mixer. To the resultant homogeneous dispersion, 4.94 g SOLVESSO® 150 was added with continued shear until a gel-like substance was afforded. This was set aside.

A pre-mix "masterbatch" gel was prepared via the addition of 4.23 g AEROSIL® 200 to 95.77 g of YUBASE® 3 under high shear until a gel-like substance was afforded. This was set aside.

As per Table 14 above, the required amount of TERSPERSE® 2520 dispersant was dissolved in a mixture comprising the remaining amount of SOLVESSO® 150 and YUBASE 3®, where the latter equated to an amount that would allow for a thidiazuron concentration in the vicinity of 20%. Thidiazuron technical was then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 µm, determined by approximation using a 0 to 100 Grind Gauge, or a 8 to 0 Hegman Gauge. Particle size analysis was additionally determined by microscopic approximation.

To the concentrate, TERMUL® 3201 emulsifier, NANSA® EVM 70/2E surfactant, TERIC® 13A7 emulsifier and the pre-prepared masterbatch gels were added, followed by the remaining quantity of YUBASE 3®. The resulting oil-based suspension was then homogenised via low-shear mixing. The composition was then shown to display satisfactory stability and further improved dilution behaviour, which meets the desired commercial performance criteria. This is another example of the methodology of adding rheology modifiers post-comminution.

Example 15—Further Improvement Upon Example 14

An oil-based suspension co-formulation of thidiazuron according to the present invention was prepared as follows:

TABLE 15

| Components | g/L |
| --- | --- |
| Thidiazuron | 100.00 |
| TERSPERSE ® 2520 dispersant | 20.00 |
| TERMUL ® 3201 emulsifier | 100.00 |
| NANSA ® EVM 70/2E surfactant | 25.00 |
| TERIC ® 13A7 emulsifier | 37.50 |
| AEROSIL ® 200 | 4.23 |
| BENTONE ® SD-1 | 14.81 |
| SOLVESSO ® 150 | 29.49 |
| YUBASE 3 ® | To volume. |

A pre-mix "masterbatch" gel was prepared via the dispersion of 14.81 g BENTONE® SD-1 (ELEMENTIS) in 83.19 g of YUBASE 3® via a SILVERSON high-shear mixer. To the resultant homogeneous dispersion, 2.00 g SOLVESSO® 150 was added with continued shear until a gel-like substance was afforded. This was set aside.

A further pre-mix "masterbatch" gel was prepared via the addition of 4.23 g AEROSIL® 200 to 95.74 g of YUBASE® 3 under high shear until a gel-like substance was afforded. This was set aside.

As per Table 15 above, the required amount of TERSPERSE® 2520 dispersant was dissolved in a mixture comprising the remaining amount of SOLVESSO® 150 and YUBASE 3®, where the latter equated to an amount that would allow for a thidiazuron concentration in the vicinity of 20%. Thidiazuron technical was then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 µm, determined by approximation using a 0 to 100 Grind Gauge, or a 8 to 0 Hegman Gauge. Particle size analysis was additionally determined by microscopic approximation.

To the concentrate, TERMUL® 3201 emulsifier, NANSA® EVM 70/2E surfactant, TERIC® 13A7 emulsifier and the pre-prepared masterbatch gels were added, followed by the remaining quantity of YUBASE 3®. The resulting oil-based suspension was then homogenised via low shear mixing. The composition was then shown to display satisfactory stability and further improved dilution behaviour which meets the desired commercial performance criteria. This is another example of the methodology of adding rheology modifiers post-comminution.

Example 16—Further Improvement Upon Example 15

TABLE 16

| Components | g/L |
| --- | --- |
| Thidiazuron | 100.00 |
| TERSPERSE ® 2520 dispersant | 10.00 |
| TERMUL ® 3201 emulsifier | 100.00 |
| NANSA ® EVM 70/2E surfactant | 25.00 |
| TERIC ® 13A7 emulsifier | 37.50 |
| AEROSIL ® 200 | 4.24 |
| BENTONE ® SD-1 | 14.21 |
| SOLVESSO ® 150 | 40.00 |
| YUBASE 3 ® | To volume. |

A pre-mix "masterbatch" gel was prepared via the dispersion of 14.21 g BENTONE® SD-1 (ELEMENTIS) in 76.39 g of YUBASE 3® via a SILVERSON high-shear mixer. To the resultant homogeneous dispersion, 9.40 g SOLVESSO® 150 was added with continued shear until a gel-like substance was afforded. This was set aside.

A further pre-mix "masterbatch" gel was prepared via the addition of 4.24 g AEROSIL® 200 to 95.76 g of YUBASE® 3 under high shear until a gel-like substance was afforded. This was set aside.

As per Table 16 above, the required amount of TERSPERSE® 2520 dispersant was dissolved in a mixture comprising the remaining amount of SOLVESSO® 150 and YUBASE 3®, where the latter equated to an amount that would allow for a thidiazuron concentration in the vicinity of 20%. Thidiazuron technical was then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 µm, determined by approximation using a 0 to 100 Grind Gauge, or a 8 to 0 Hegman Gauge. Particle size analysis was additionally determined by microscopic approximation. Particle size analysis was additionally determined by microscopy, where the dispersion displayed weak to moderate flocculation of active ingredient crystals.

To the required amount of pre-mix carrier, TERMUL® 3201 emulsifier, NANSA® EVM 70/2E surfactant, TERIC® 13A7 emulsifier was added with stirring, followed by the slow addition of the millbase concentrate and the remaining quantity of YUBASE 3®. Stirring was continued until a homogeneous suspension was afforded. This composition was shown to display further improved stability behaviour. This is another example of the methodology of adding rheology modifiers post-comminution.

Example 17—Further Improvement Upon Example 12

TABLE 17

| Components | g/L |
| --- | --- |
| Diuron | 30.00 |
| Thidiazuron | 60.00 |
| TERSPERSE ® 2520 dispersant | 10.00 |
| TERMUL ® 3201 emulsifier | 100.00 |
| NANSA ® EVM 70/2E surfactant | 25.00 |
| TERIC ® 13A7 emulsifier | 40.00 |
| AEROSIL ® 200 | 4.23 |
| BENTONE ® SD-1 | 14.21 |
| SOLVESSO ® 150 | 50.00 |
| YUBASE 3 ® | To volume. |

A pre-mix carrier was prepared via the dispersion of 14.21 g BENTONE® SD-1 (ELEMENTIS) in 200 g of YUBASE 3® via a SILVERSON high-shear mixer. To the resultant homogeneous dispersion, 9.40 g SOLVESSO® 150 was added with continued shear until a gel-like consistency was afforded. Finally, 4.23 g AEROSIL® 200 was added under low-shear mixing until a homogeneous albeit flowable gel was afforded. The mixture was set aside.

As per Table 17 above, the required amount of TERSPERSE® 2520 dispersant was dissolved in a mixture comprising the remaining amount of SOLVESSO® 150 and YUBASE 3®, where the latter equated to an amount that would allow for a thidiazuron concentration in the vicinity of 20%. Diuron and thidiazuron technical was then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopy, where the dispersion displayed weak to moderate flocculation of active ingredient crystals.

To the required amount of pre-mix carrier, TERMUL® 3201 emulsifier, NANSA® EVM 70/2E surfactant, TERIC® 13A7 emulsifier was added with stirring, followed by the slow addition of the millbase concentrate and the remaining quantity of YUBASE 3®. Stirring was continued until a homogeneous suspension was afforded. This composition was shown to display further improved stability behaviour. This is another example of the methodology of adding rheology modifiers post-comminution.

Example 18—Further Improvement Upon Example 16

TABLE 18

| Components | g/L |
| --- | --- |
| Thidiazuron | 100.00 |
| TERSPERSE ® 2520 dispersant | 10.00 |
| TERMUL ® 3201 emulsifier | 100.00 |
| NANSA ® EVM 70/2E surfactant | 25.00 |
| TERIC ® 13A7 emulsifier | 37.50 |
| AEROSIL ® 200 | 4.24 |
| BENTONE ® SD-1 | 14.21 |
| SOLVESSO ® 150 | 40.00 |
| YUBASE 3 ® | To volume. |

A pre-mix carrier was prepared via the dispersion of 14.21 g BENTONE® SD-1 (ELEMENTIS) in 200 g of YUBASE 3® via a SILVERSON high-shear mixer. To the resultant homogeneous dispersion, 9.40 g SOLVESSO® 150 was added with continued shear until a gel-like consistency was afforded. Finally, 4.24 g AEROSIL® 200 was added under low-shear mixing until a homogeneous albeit flowable gel was afforded. The mixture was set aside.

As per Table 18 above, the required amount of TERSPERSE® 2520 dispersant was dissolved in a mixture comprising the remaining amount of SOLVESSO® 150 and YUBASE 3®, where the latter equated to an amount that would allow for a thidiazuron concentration in the vicinity of 20%. Thidiazuron technical was then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopic approximation. This concentrate was briefly set aside.

To the required amount of pre-mix carrier, TERMUL® 3201 emulsifier, NANSA® EVM 70/2E surfactant, TERIC® 13A7 emulsifier was added with stirring. The resultant mixture was then heated to approximately 60° C. to 70° C., and with continued stirring, the millbase concentrate was slowly added followed by the remaining quantity of YUBASE 3®. Stirring was continued while allowing the composition to cool, affording a homogeneous suspension. This composition was shown to display improved stability behaviour. This is another example of the methodology of adding rheology modifiers post-comminution.

Example 19—Alternative to Example 15—Addition of Titanium Dioxide

TABLE 19

| Components | g/L |
| --- | --- |
| Thidiazuron | 100.00 |
| TERSPERSE ® 2520 dispersant | 10.00 |
| TERMUL ® 3201 emulsifier | 100.00 |
| NANSA ® EVM 70/2E surfactant | 25.00 |
| TERIC ® 13A7 emulsifier | 37.50 |
| TIONA 625 | 10.00 |
| AEROSIL ® 200 | 4.21 |
| BENTONE ® SD-1 | 14.21 |
| SOLVESSO ® 150 | 40.00 |
| YUBASE 3 ® | To volume. |

A pre-mix carrier was prepared via the dispersion of 3.90 g BENTONE® SD-1 (ELEMENTIS) in 47.83 g of YUBASE 3® via a SILVERSON high-shear mixer, yielding a very fine suspension. To the resultant homogeneous dispersion, 2.57 g SOLVESSO® 150 was added with continued shear until a gel-like consistency was afforded. 27.41 g TERMUL® 3201, 6.85 g NANSA® EVM70/2E, and 10.28 g TERIC® 13A7 were then added to the mixture followed by low-speed mixing to homogenise. Lastly, 1.15 g AEROSIL® 200 was added slowly under low-shear mixing until a homogeneous, weakly gelled mixture was afforded. The mixture was set aside.

As per Table 19 above, the required amount of TERSPERSE® 2520 dispersant was dissolved in a mixture comprising the remaining amount of SOLVESSO® 150 and YUBASE 3®, where the latter equated to an amount that would allow for a thidiazuron concentration in the vicinity of 20%. Thidiazuron technical and TIONA 625 were then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopic approximation.

To the required amount of pre-mixed carrier, the millbase concentrate was slowly added followed by the remaining quantity of YUBASE 3®. Stirring was continued until a homogeneous suspension was afforded. This composition was shown to display further improved stability behaviour. This is another example of the methodology of adding rheology modifiers post-comminution.

Example 20—Alternative to Example 16—No Dispersant Required

TABLE 20

| Components | g/L |
| --- | --- |
| Thidiazuron | 100.00 |
| TERMUL ® 3201 emulsifier | 200.00 |
| NANSA ® EVM 70/2E surfactant | 50.00 |
| TERIC ® 13A7 emulsifier | 75.00 |
| AEROSIL ® 200 | 4.24 |
| BENTONE ® SD-1 | 14.21 |
| SOLVESSO ® 150 | 40.00 |
| YUBASE 3 ® | To volume. |

A pre-mix "carrier-base" was prepared via the dispersion of 14.21 g BENTONE® SD-1 (ELEMENTIS) in 200 g of YUBASE 3® via a SILVERSON high-shear mixer. To the resultant homogeneous dispersion, 9.40 g SOLVESSO® 150 was added with continued shear until a gel-like consistency was afforded. Finally, 4.24 g AEROSIL® 200 was added under low-shear mixing until a homogeneous albeit flowable gel was afforded. The mixture was set aside.

As per Table 20 above, half the required amounts of TERMUL® 3201, NANSA® EVM70/2E and TERIC® 13A7 were added to a mixture comprising the remaining amount of SOLVESSO® 150 and YUBASE 3®, where the latter equated to an amount that would allow for a thidiazuron concentration in the vicinity of 15%. Thidiazuron technical was then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopic approximation.

To the required amount of pre-made "carrier-base", the remaining TERMUL® 3201 emulsifier, NANSA® EVM 70/2E surfactant, TERIC® 13A7 emulsifier was added with stirring, followed by the slow addition of the millbase concentrate and the remaining quantity of YUBASE 3®. Stirring was continued until a homogeneous suspension was afforded. This composition was shown to display further improved stability behaviour. This is another example of the methodology of adding rheology modifiers post-comminution.

Example 21—Alternative to Example 16

TABLE 21

| Components | g/L |
|---|---|
| Thidiazuron | 100.00 |
| TERSPERSE ® 2520 dispersant | 15.00 |
| ELTESOL ® SC93 | 15.00 |
| TERMUL ® 3201 emulsifier | 100.00 |
| NANSA ® EVM 70/2E surfactant | 25.00 |
| TERIC ® 13A7 emulsifier | 37.50 |
| AEROSIL ® 200 | 4.24 |
| BENTONE ® SD-1 | 14.21 |
| SOLVESSO ® 150 | 40.00 |
| YUBASE 3 ® | To volume. |

A pre-mix carrier was prepared via the dispersion of 3.90 g BENTONE® SD-1 (ELEMENTIS) in 47.83 g of YUBASE 3® via a SILVERSON high-shear mixer, yielding a very fine suspension. To the resultant homogeneous dispersion, 2.57 g SOLVESSO® 150 was added with continued shear until a gel-like consistency was afforded. 27.41 g TERMUL® 3201, 6.85 g NANSA® EVM70/2E, and 10.28 g TERIC® 13A7 were then added to the mixture followed by low-speed mixing to homogenise. Lastly, 1.15 g AEROSIL® 200 was added slowly under low-shear mixing until a homogeneous, weakly gelled mixture was afforded. The mixture was set aside.

As per Table 21 above, the required amount of TERSPERSE® 2520 dispersant was dissolved in a mixture comprising the remaining amount of SOLVESSO® 150 and YUBASE 3°, where the latter equated to an amount that would allow for a thidiazuron concentration in the vicinity of 15%. Thidiazuron technical and TIONA 625 were then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopic approximation.

To the required amount of pre-mixed carrier, the millbase concentrate was slowly added followed by the remaining quantity of YUBASE 3®. Stirring was continued until a homogeneous suspension was afforded. This composition was shown to display further improved stability behaviour. This is another example of the methodology of adding rheology modifiers post-comminution.

It is anticipated that the methods and compositions improving upon EXAMPLE 16 will also further improve the stability characteristics of EXAMPLE 17.

Example 22—Alternative to Example 16

TABLE 22

| Components | g/L |
|---|---|
| Thidiazuron | 100.00 |
| TERSPERSE ® 4890 dispersant | 20.00 |
| TERMUL ® 3201 emulsifier | 100.00 |
| NANSA ® EVM 70/2E surfactant | 25.00 |
| TERIC ® 13A7 emulsifier | 37.50 |
| AEROSIL ® 200 | 4.21 |
| BENTONE ® SD-1 | 14.21 |
| SOLVESSO ® 150 | 19.39 |
| YUBASE 3 ® | To volume. |

A pre-mix carrier was prepared via the dispersion of 3.90 g BENTONE® SD-1 (ELEMENTIS) in 47.83 g of YUBASE 3® via a SILVERSON high-shear mixer, yielding a very fine suspension. To the resultant homogeneous dispersion, 2.57 g SOLVESSO® 150 was added with continued shear until a gel-like consistency was afforded. 27.41 g TERMUL® 3201, 6.85 g NANSA® EVM70/2E, and 10.28 g TERIC® 13A7 were then added to the mixture followed by low-speed mixing to homogenise. Lastly, 1.15 g AEROSIL® 200 was added slowly under low-shear mixing until a homogeneous, weakly gelled mixture was afforded. The mixture was set aside.

As per Table 22 above, the required amount of TERSPERSE® 4890 dispersant was dissolved in a mixture comprising the remaining amount of SOLVESSO® 150 and YUBASE 3®, where the latter equated to an amount that would allow for a thidiazuron concentration in the vicinity of 15%. Thidiazuron technical was then dispersed in the resultant mixture under high-shear using a SILVERSON mixer. This was continued until a homogeneous mixture was afforded.

This slurry was then comminuted using a horizontal mill (Engineered Mills, Inc.). The process involved slowly feeding the concentrate into the milling apparatus operating at a low rotational speed of from 500 to 1000 RPM, wherein the mill grinding chamber had been pre-loaded with from 1 to 1.6 mm diameter glass, or more preferably, zirconium silica media from 60 to 80% of total volume capacity, and the jacketed coolant temperature was pre-set and maintained at an externally controlled temperature of from 15 to 25° C. Rotational speed was slowly increased from 2000 to 2500 RPM for a period of from 30 to 45 minutes, producing a concentrate with an average (d0.5) particle size of roughly 5 μm, determined by approximation using a 0 to 100 Grind Gauge, or a 8 to 0 Hegman Gauge. Particle size analysis was additionally determined by microscopic approximation.

To the required amount of pre-mixed carrier the millbase concentrate was slowly added followed by the remaining quantity of YUBASE 3®. Stirring was continued until a homogeneous suspension was afforded. Despite the improved dispersion characteristics of the millbase concentrate (EXAMPLE 10), this composition was shown to display a significant reduction in stability behaviour. This is another example of the methodology of adding rheology modifiers post-comminution.

Example 23—Formulation Stability

The critical measure of stability for the aforementioned oil-based suspension co-formulations of thidiazuron, according to the present invention, were simple visual observations of samples stored at ambient, room temperature over an extended period.

TABLE 23

| Formulation | Days after preparation | Stability Observations Stored at Ambient Temperature, Days after Preparation. | Stability Rating |
|---|---|---|---|
| EXAMPLE 12 | 35 | Thickened suspension, poor flowability. | Fail |
| EXAMPLE 13 | 19 | Thickened suspension, poor flowability. | Fail |
| EXAMPLE 14 | 54 | Partly flowable suspension | Fail |
| EXAMPLE 15 | 48 | Thickened suspension | Fail |
| EXAMPLE 16 | 48 | Partly flowable suspension | Fail |
| EXAMPLE 17 | 98 | Flowable suspension | Pass |
| EXAMPLE 18 | 69 | Flowable suspension | Pass |
| EXAMPLE 19 | 56 | Flowable suspension | Pass |
| EXAMPLE 20 | 97 | Flowable suspension | Pass |
| EXAMPLE 21 | 80 | Flowable suspension | Pass |
| EXAMPLE 22 | 8 | Thickened, barely flowable suspension | Fail |

Example 24.1

TABLE 24.1

Mean Percentage Defoliation, Locale A

| Treatment | Rate mL product/ha | Rate g ai/ha | 4 DAT | 7 DAT | 14 DAT |
|---|---|---|---|---|---|
| 1. Untreated Control | | | 0.4 | 6.5 | 19.9 |
| 2. EXAMPLE 1 + D-C TRON* | 150 + 1000 | $75^a + 827^c$ | 8.0 | 26.7 | 52.5 |
| 3. EXAMPLE 1 + D-C TRON* | 200 + 1000 | $100^a + 827^c$ | 6.9 | 43.6 | 68.7 |
| 4. EXAMPLE 2 + D-C TRON* | 250 + 1000 | $30^a + 15^b + 827^c$ | 6.3 | 32.4 | 58.8 |
| 5. EXAMPLE 2 + D-C TRON* | 400 + 1000 | $48^a + 24^b + 827^c$ | 12.5 | 45.7 | 74.2 |
| 6. EXAMPLE 2 + D-C TRON* | 800 + 1000 | $96^a + 48^b + 827^c$ | 12.4 | 41.6 | 67.2 |
| 7. EXAMPLE 3 | 1000 | $30^a + 15^b + 675^c$ | 12.8 | 41.9 | 62.3 |
| 8. EXAMPLE 3 | 1600 | $48^a + 24^b + 1080^c$ | 13.1 | 42.5 | 71.8 |
| 9. EXAMPLE 3 | 3200 | $96^a + 48^b + 2160^c$ | 22.0 | 52.9 | 79.9 |
| 10. EXAMPLE 4 | 500 | $30^a + 15^b + 330^c$ | 24.4 | 37.9 | 60.7 |
| 11. EXAMPLE 4 | 800 | $48^a + 24^b + 528^c$ | 28.9 | 52.0 | 71.4 |
| 12. EXAMPLE 4 | 1600 | $96^a + 48^b + 1056^c$ | 36.9 | 61.6 | 72.5 |
| 13. EXAMPLE 5 | 750 | $75^a + 488^c$ | 12.1 | 43.7 | 64.5 |
| 14. EXAMPLE 5 | 1000 | $100^a + 650^c$ | 45.8 | 48.9 | 68.2 |

$^a$ = rate g ai/ha of thidiazuron
$^b$ = rate g ai/ha of diuron
$^c$ = rate g ai/ha of oil
*DC-TRON is a spray oil which contains 827 g/L petroleum oil and between 80-100 g/L of emulsifying agent/s.

Example 24.2

TABLE 24.2

Mean Percentage Defoliation, Locale B

| Treatment | Rate mL product/ha | Rate g ai/ha | 8 DAT | 14 DAT |
|---|---|---|---|---|
| 1. Untreated | | | 26.2 | 40.5 |
| 2. EXAMPLE 1 + D-C TRON* | 150 + 1000 | $75^a + 827^c$ | 29.2 | 50.6 |
| 3. EXAMPLE 1 + D-C TRON* | 200 + 1000 | $100^a + 827^c$ | 31.3 | 65.6 |
| 4. EXAMPLE 2 + D-C TRON* | 250 + 1000 | $30^a + 15^b + 827^c$ | 30.6 | 56.7 |
| 5. EXAMPLE 2 + D-C TRON* | 400 + 1000 | $48^a + 24^b + 827^c$ | 31.2 | 62.7 |
| 6. EXAMPLE 2 + D-C TRON* | 800 + 1000 | $96^a + 48^b + 827^c$ | 30.6 | 62.4 |
| 7. EXAMPLE 3 | 1000 | $30^a + 15^b + 675^c$ | 35.8 | 66.5 |
| 8. EXAMPLE 3 | 1600 | $48^a + 24^b + 1080^c$ | 46.3 | 77.8 |
| 9. EXAMPLE 3 | 3200 | $96^a + 48^b + 2160^c$ | 46.5 | 67.2 |
| 10. EXAMPLE 4 | 500 | $30^a + 15^b + 330^c$ | 36.7 | 70.4 |
| 11. EXAMPLE 4 | 800 | $48^a + 24^b + 528^c$ | 40.1 | 71.9 |
| 12. EXAMPLE 4 | 1600 | $96^a + 48^b + 1056^c$ | 48.5 | 73.4 |
| 13. EXAMPLE 5 | 750 | $75^a + 488^c$ | 29.6 | 65.7 |
| 14. EXAMPLE 5 | 1000 | $100^a + 650^c$ | 27.1 | 62.7 |

$^a$ = rate g ai/ha of thidiazuron
$^b$ = rate g ai/ha of diuron
$^c$ = rate g ai/ha of oil
*DC-TRON is a spray oil which contains 827 g/L petroleum oil and between 80-100 g/L of emulsifying agent/s.

Results

The results obtained following the use of the co-formulations of the present invention and their efficacy are as illustrated above. In all cases, synergy is demonstrated and shown by the retention or improvement in defoliation performance, when compared to the use of formulations of the prior art, as is shown in Examples 24.1 and 24.2 above and despite reductions in total agrochemical inputs.

In Tables 24.1 and 24.2 above, when assessing the synergism of the co-formulation of thidiazuron, or thidiazuron and diuron, with an oil, the skilled person must be conscious of application rates.

In this particular instance, it is suggested that the synergism afforded by the preparation of a formulation described in EXAMPLES 3 to 5, when used at a given rate, is shown by defoliation performance, which is equivalent to or better than formulations of thidiazuron, or thidiazuron and diuron, as described by EXAMPLES 1 and 2, applied at equivalent rates based on active ingredient per hectare, and a spray oil, applied at a typical rate, individually. It is likely that there is an enhanced effect achieved by co-formulating thidiazuron, or thidiazuron and diuron, with an oil, whereby essentially equivalent or better performance is achieved through significantly reduced agrochemical input. Alternatively, the enhanced effect may elicit the use of less formulation, or that thidiazuron, or thidiazuron and diuron, is displaying improved defoliation efficiency facilitated by co-formulation with oil.

EXAMPLE 24.1, as illustrated in Table 24.1 above, highlights the synergistic effects afforded by co-formulation of an oil with either a plant growth regulator on its own, or with a mixture of a plant growth regulator and an herbicide, in comparison to the customary use of a plant growth regulator or a mixture of a plant growth regulator and an herbicide in combination with a formulated spraying oil.

With respect to the co-formulation of an oil and a plant growth regulator used on its own, the synergism is best represented by Treatment 13 in Table 24.1, where thidiazuron is applied as an oil-based co-formulation or OD formulation. At 4, 7 and 14 days after treatment ("DAT"), this treatment consistently shows statistically improved defoliation when compared to Treatment 2, where thidiazuron is applied alongside a spraying oil formulation in a customary fashion. These results have been achieved through a 34.8% reduction in total agrochemical input per hectare. Additionally, Treatment 13 may be viewed as comparable to Treatment 3 in terms of defoliation performance, whereby the total agrochemical input and biologically active defoliant applied per hectare have been reduced by 37.5% and 25%, respectively.

With respect to the co-formulation of an oil and a mixture of plant growth regulator and an herbicide, the synergism is best represented by Treatment 10 in Table 24.1. At 4, 7 and 14 DAT, this treatment consistently shows improved defoliation performance when compared to Treatment 4 in Table 24.1, which uses a spray oil formulation and using the equivalent plant growth regulator and herbicide rates. These results have been achieved through a 60% reduction in total agrochemical input per hectare.

Example 24.2, as illustrated in Table 24.2 above, highlights the synergistic effects afforded by co-formulation of an oil with a plant growth regulator, or with a mixture of a plant growth regulator and an herbicide, in comparison to the use of a traditional plant growth regulator or a mixture of plant growth regulator and herbicide in combination with a spray oil as shown in Examples 1 and 2.

With respect to the co-formulation of an oil with a plant growth regulator on its own, synergism is again best represented by Treatment 13 in Table 24.2. At 8 days after treatment ("DAT"), this treatment shows statistically equivalent defoliation when compared to Treatment 2 in Table 24.2. At 14 DAT, Treatment 13 shows statistically improved defoliation performance when compared to Treatment 2. These results have been achieved through a 34.8% reduction in the total agrochemical input per hectare. Again, Treatment 13 may even be viewed as comparable to Treatment 3 in terms of defoliation performance, whereby the total agrochemical input and biologically active defoliant applied per hectare have been reduced by 37.5% and 25%, respectively.

With respect to the co-formulation of an oil and a mixture of a plant growth regulator and an herbicide, the synergism is best represented by Treatment 10 in Table 24.2. At 8 DAT, this treatment shows marginally improved defoliation performance when compared to Treatment 4. At 14 DAT, Treatment 10 is statistically superior. These results have been achieved through a 60% reduction in total agrochemical input per hectare.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein, but is to be accorded the full scope of the claims, so as to embrace any and all equivalent devices and apparatus. Any discussion of the prior art throughout the specification should in no way be considered as an admission that such prior art is widely known or forms part of the common general knowledge in this field.

Where the terms "comprise", "comprises", "comprised" or "comprising" or the terms "include", "includes", "included" or "including" are used in this specification, they are to be interpreted as specifying the presence of the stated features, integers, steps or components referred to, but not to preclude the presence or addition of one or more other feature, integer, step, component or group thereof.

The claims defining the invention are as follows:

1. An agricultural co-formulation comprising:
   i) an effective amount of at least one plant growth regulator, or at least one plant growth regulator and an additional biologically active ingredient;
   ii) at least 50% w/v of at least one oil;
   iii) 1 to 70 g/L of at least one oil-soluble surfactant dispersing agent comprising a random polyester condensate;
   iv) at least one emulsifying agent; and
   v) 1 to 20 g/L of a rheology modifier comprising fumed silica or a gelling clay, wherein the plant growth regulator, or the plant growth regulator and the additional biologically active ingredient are dispersed in the oil;

wherein the final concentration of at least one plant growth regulator, or at least one plant growth regulator and an additional biologically active ingredient, is optionally adjusted by adding additional oil and one or more rheology modifiers and/or activation agents as required to substantially stabilize the co-formulation; and wherein the efficacy of the plant growth regulator is substantially maintained or improved; and wherein the co-formulation has been prepared by post-comminution of a millbase concentrate comprising the oil-soluble surfactant dispersing agent, the oil, and the plant growth regulator, or the plant growth regulator and the additional biologically active ingredient, and the comminuted form has an average particle size in the range of from 1 to 12 microns.

2. The co-formulation according to claim 1, wherein the co-formulation is in a form selected from an oil dispersion (OD) concentrate, an oil-miscible flowable (OF) concentrate, an oil-based suspension concentrate (SC), or an oil-based suspoemulsion (SE).

3. The co-formulation according claim 2, wherein the plant growth regulator is thidiazuron.

4. The co-formulation according claim 3, wherein thidiazuron is present in a concentration range of from 1 to 250 g/L.

5. The co-formulation according claim 4, wherein thidiazuron is present in a concentration range of from 1 to 200 g/L.

6. The co-formulation according claim 5, wherein thidiazuron is present in a concentration range of from 1 to 120 g/L.

7. The co-formulation according claim 6, wherein thidiazuron is present in a concentration of 100 g/L.

8. The co-formulation according to claim 1, wherein the at least one additional biologically active ingredient is selected from a fungicide; an insecticide; a herbicide; a miticide; a nematocide; a molluscicide; an algicide; or a pesticide; or any mixtures thereof.

9. The co-formulation according to claim 8, wherein the additional biologically active ingredient is at least one herbicide.

10. The co-formulation according claim 9, wherein the plant growth regulator is thidiazuron and the herbicide is diuron.

11. The co-formulation according claim 10, wherein thidiazuron is present in a concentration range of from 1 to 100 g/L and diuron is present in a concentration range of from 1 to 100 g/L.

12. The co-formulation according claim 11, wherein thidiazuron is present in a concentration of 60 g/L and diuron is present in a concentration of 30 g/L.

13. The co-formulation according claim 1, wherein the at least one oil is selected from at least one paraffin oil, at least one seed oil ester, at least one aromatic hydrocarbon, at least one polyalkylene glycol ether, at least one fatty acid diester, at least one fatty alkylamide or diamide, at least one dialkylene carbonate, at least one ketone, or at least one alcohol, or any mixtures thereof.

14. The co-formulation according to claim 1, wherein the at least one oil is present in a concentration of greater than 55% w/v.

15. The co-formulation according to claim 1, wherein the oil-soluble surfactant dispersing agent comprises the random polyester condensate and a condensation product of the reaction of polyalkylene glycol or polyalkylene glycol ether, and a fatty acid.

16. The co-formulation according to claim 1, wherein the rheology modifier is present in an amount of 1 to 15 g/L.

17. The co-formulation according to claim 1, where the millbase concentrate comprising the plant growth regulator has been comminuted in a horizontal mill.

18. The co-formulation according claim 17, wherein the average particle size is in the range from 1 to 8 microns.

19. The co-formulation according claim 18, wherein the average particle size is in the range from 1 to 6 microns.

20. The co-formulation according claim 19, wherein the average particle size is about 5 microns.

21. The co-formulation according claim 1, wherein thidiazuron is present in a concentration range of from 1 to 100 g/L and diuron is present in a concentration range of from 1 to 100 g/L, and
wherein the at least one oil is present in a concentration of greater than 55% w/v.

22. A method of preparing the co-formulation according to claim 1 comprising the following steps, wherein steps c) and d) may be carried out in any order or simultaneously:
  a) comminuting the at least one plant growth regulator, or at least one plant growth regulator and an additional biologically active ingredient, to achieve an average particle size in the range of from 1 to 12 microns;
  b) adding the comminuted at least one plant growth regulator, or at least one plant growth regulator and an additional biologically active ingredient, to at least one oil either by stirring or high-shear mixing to create an oil dispersion;
  c) adding the at least one oil-soluble surfactant dispersing agent to the oil dispersion;
  d) adding the at least one emulsifying agent to the oil dispersion; and optionally
  e) adjusting the temperature of the oil dispersion to between about 60° C. and 70° C. with stirring; and optionally
  f) adjusting the final concentration of the at least one plant growth regulator, or at least one plant growth regulator and an additional biologically active ingredient, in the dispersion by adding additional oil and one or more rheology modifiers and/or activation agents as required to substantially stabilise the co-formulation.

23. A method of preparing the substantially stable co-formulation of claim 16, comprising the following steps, wherein steps e) and f) may be carried out in any order or simultaneously:
  a) combining the at least one rheology modifier/s with the at least one oil;
  b) adding the at least one plant growth regulator, or the at least one plant growth regulator and the additional biologically active ingredient, to the oil containing the at least one rheology modifier/s either by stirring or high-shear mixing to create an oil dispersion;
  c) developing the desired rheological behaviour of the oil dispersion via addition of at least one activation agent/s;
  d) comminuting the oil dispersion of step c) to achieve an average particle size of the at least one plant growth regulator, or at least one plant growth regulator and an additional biologically active ingredient, in the range of from 1 to 12 microns;
  e) adding the at least one oil-soluble surfactant dispersing agent to the oil dispersion;
  f) adding the at least one emulsifying agent to the oil dispersion; and optionally
  g) adjusting the temperature of the oil dispersion to between about 60° C. and 70° C. with stirring; and optionally
  h) adjusting the final concentration of the at least one plant growth regulator, or at least one plant growth regulator and an additional biologically active ingredient, in the dispersion by adding additional oil and one or more additional activation agents as required to substantially stabilise the co-formulation.

24. A method of preparing the co-formulation according to claim 1 comprising the following steps:

a) adding the at least one oil-soluble surfactant dispersing agent or the at least one emulsifying agent to the at least one oil;
b) adding the at least one plant growth regulator, or the at least one plant growth regulator and the additional biologically active ingredient, to the oil either by stirring or high-shear mixing to create an oil dispersion;
c) adding at least one activation agent to further develop a desired stability behaviour of the oil dispersion;
d) comminuting the oil dispersion of step c) to achieve an average particle size of the at least one plant growth regulator, or the at least one plant growth regulator and the additional biologically active ingredient, of from 1 to 12 microns; and optionally
e) adjusting the temperature of the oil dispersion to between about 60° C. and 70° C. with stirring; and optionally
f) adjusting the final concentration of the at least one plant growth regulator, or the at least one plant growth regulator and the additional biologically active ingredient, in the dispersion by adding additional oil, at least one emulsifying agent, and one or more rheology modifiers and/or at least one additional activation agents as required to substantially stabilise the co-formulation.

25. A method of preparing a substantially homogenous and stable agricultural co-formulation according to claim 1 comprising the following steps, wherein steps a) to d) are carried out before or after steps e) to g) and before step h):
a) adding the at least one oil-soluble surfactant dispersing agent or the at least one emulsifying agent to at least one first oil;
b) adding an effective amount of the at least one plant growth regulator, or the at least one plant growth regulator and the additional biologically active ingredient, in the first oil with stirring or high-shear mixing to create an oil dispersion;
c) adding at least one activation agent to further develop a desired stability behaviour of the oil dispersion;
d) comminuting the oil dispersion of step c) to produce a substantially homogeneous first dispersion concentrate containing the at least one plant growth regulator, or at least one plant growth regulator and an additional biologically active ingredient, having an average particle size in the range of from 1 to 12 microns;
e) dispersing at least one rheology modifier in at least one second oil by stirring or high-shear mixing to form a second substantially homogeneous dispersion concentrate in the form of a gel;
f) adding at least one solvent to the second dispersion concentrate with continued stirring or high-shear mixing to form an improved gel;
g) dispersing at least one oil-soluble surfactant dispersing or at least one emulsifying agent into the improved gel by stirring or high-shear mixing to form a second substantially homogeneous dispersion concentrate;
h) adding at least one other rheology modifier to the gel of step g) under low-shear mixing to form a pre-mix carrier; and
i) adding an amount of the first dispersion concentrate to an amount of the pre-mix carrier to obtain the substantially homogenous and stable co-formulation.

* * * * *